(12) United States Patent
Laufer et al.

(10) Patent No.: US 8,297,948 B2
(45) Date of Patent: Oct. 30, 2012

(54) ARRANGEMENT FOR DELIVERING FLUIDS

(75) Inventors: Wolfgang Laufer, Aichhalden (DE); Siegfried Seidler, Villingen-Schwenningen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 245 days.

(21) Appl. No.: 12/522,918

(22) PCT Filed: Jan. 26, 2008

(86) PCT No.: PCT/EP2008/000617
§ 371 (c)(1),
(2), (4) Date: Jul. 12, 2009

(87) PCT Pub. No.: WO2008/119404
PCT Pub. Date: Oct. 9, 2008

(65) Prior Publication Data
US 2010/0074777 A1 Mar. 25, 2010

(30) Foreign Application Priority Data

Mar. 31, 2007 (DE) ............... 20 2007 005 060 U
May 14, 2007 (DE) ............... 20 2007 006 917 U

(51) Int. Cl.
*F04B 17/00* (2006.01)
*F04B 35/04* (2006.01)

(52) U.S. Cl. ............... 417/420; 417/423.8; 417/423.7; 310/86; 310/87

(58) Field of Classification Search ............... 417/420, 417/423.1, 423.7, 423.12, 210, 202, 423.8; 310/86, 87, 43
See application file for complete search history.

(56) References Cited

U.S. PATENT DOCUMENTS 5,059,844 A * 10/1991 Anstine ............... 310/90
(Continued)

FOREIGN PATENT DOCUMENTS

| DE | 42 38 132 C | 5/1994 |
| DE | 202005 003 689 U | 7/2005 |
| DE | 20 2005 014 301 U | 1/2006 |
| DE | 202005 014 297 U | 1/2006 |

(Continued)

OTHER PUBLICATIONS

Fasteners Handbook by Julius Soled, Book Division, Reinhold Pub. Corp., 1957, p. 300.*

*Primary Examiner* — Devon Kramer
*Assistant Examiner* — Thomas Fink
(74) *Attorney, Agent, or Firm* — Milton Oliver, Esq.; Oliver Intellectual Property LLC

(57) ABSTRACT

An arrangement for dissipating heat from components producing high heat flux densities, such as computers, features a combination fan and fluid pump with a magnetic coupling (93) which acts across a fluid-tight partitioning can (52). The pump has a pump wheel (90) connected to a first permanent magnet (92), and an electronically commutated internal-rotor motor (ECM 70) to drive it. The motor has a stator (68) inside which is rotatably arranged a rotor (60) equipped with a second permanent magnet (64). Interaction between the first and second permanent magnets creates the magnetic coupling (93). The stator (68) of the internal-rotor motor (70) is arranged radially outside the magnetic coupling (93). A first shaft (54), arranged on the outer side of the can (52), serves for rotatable journaling of the rotor (60) of the internal-rotor motor (70) and a second shaft (50) inside the can serves for journaling the pump rotor.

22 Claims, 4 Drawing Sheets

U.S. PATENT DOCUMENTS

| | | | | |
|---|---|---|---|---|
| 6,309,188 B1 * | 10/2001 | Danner | ........................ | 417/366 |
| 7,262,532 B2 | 8/2007 | Seidler et al. | ................. | 310/103 |
| 2008/0038126 A1 | 2/2008 | Berroth | ........................ | 417/420 |
| 2008/0061638 A1 | 3/2008 | Lulic | ............................. | 310/62 |
| 2009/0010769 A1 * | 1/2009 | Laufer et al. | .................. | 417/201 |
| 2009/0074594 A1 | 3/2009 | Strasser | ........................ | 417/352 |

FOREIGN PATENT DOCUMENTS

| | | |
|---|---|---|
| DE | 20 2005 013 923 U | 2/2006 |
| DE | 202005013923 U1 * | 2/2006 |
| DE | 20 2005 017 738 U | 3/2006 |
| DE | 20 2005 017 787 U | 3/2006 |
| WO | 2006-056249 | 6/2006 |

* cited by examiner

ARRANGEMENT FOR DELIVERING FLUIDS

CROSS-REFERENCE TO RELATED APPLICATION(S)

This application is a section 371 of International Application PCT/EP08/00617 filed 26 Jan. 2008 and published as WO-2008-119404-A.

FIELD OF THE INVENTION

The present invention relates to an arrangement for delivering fluids. Liquid and/or gaseous media can be delivered as fluids.

BACKGROUND

Components having high heat flux densities, for example 60 W/cm$^2$, are used today especially in computers. Heat from these components must first be transferred into a liquid circulation system, and from there it is discharged to the ambient air via a liquid-air heat exchanger. The dissipation of heat from components having a high heat flux density is accomplished by means of heat absorbers or so-called "cold plates." In these, heat is transferred to a cooling liquid, and the latter usually is caused to circulate in forced fashion in a circulation system.

In this context, the cooling liquid flows not only through the heat exchanger but also through a liquid pump, which produces the forced circulation and produces an appropriate pressure buildup and an appropriate volumetric flow rate through the heat absorber and an associated heat exchanger, so that the pertinent heat transfer coefficients become high, and the temperature gradients necessary for heat transfer become low.

A fan is usually arranged at the heat exchanger and produces, on the air side of the heat exchanger, forced convection of the cooling air and good transfer coefficients.

SUMMARY OF THE INVENTION

It is an object of the invention to make available a novel compact arrangement for delivering fluids.
According to the invention, this object is achieved by using a partitioning can to hermetically separate a fluid pump from a concentrically surrounding fan motor, which transfers power to it across a magnetic coupling between a first permanent magnet forming part of the fan and a second permanent magnet forming part of the pump. A compact arrangement with good efficiency is thereby obtained.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
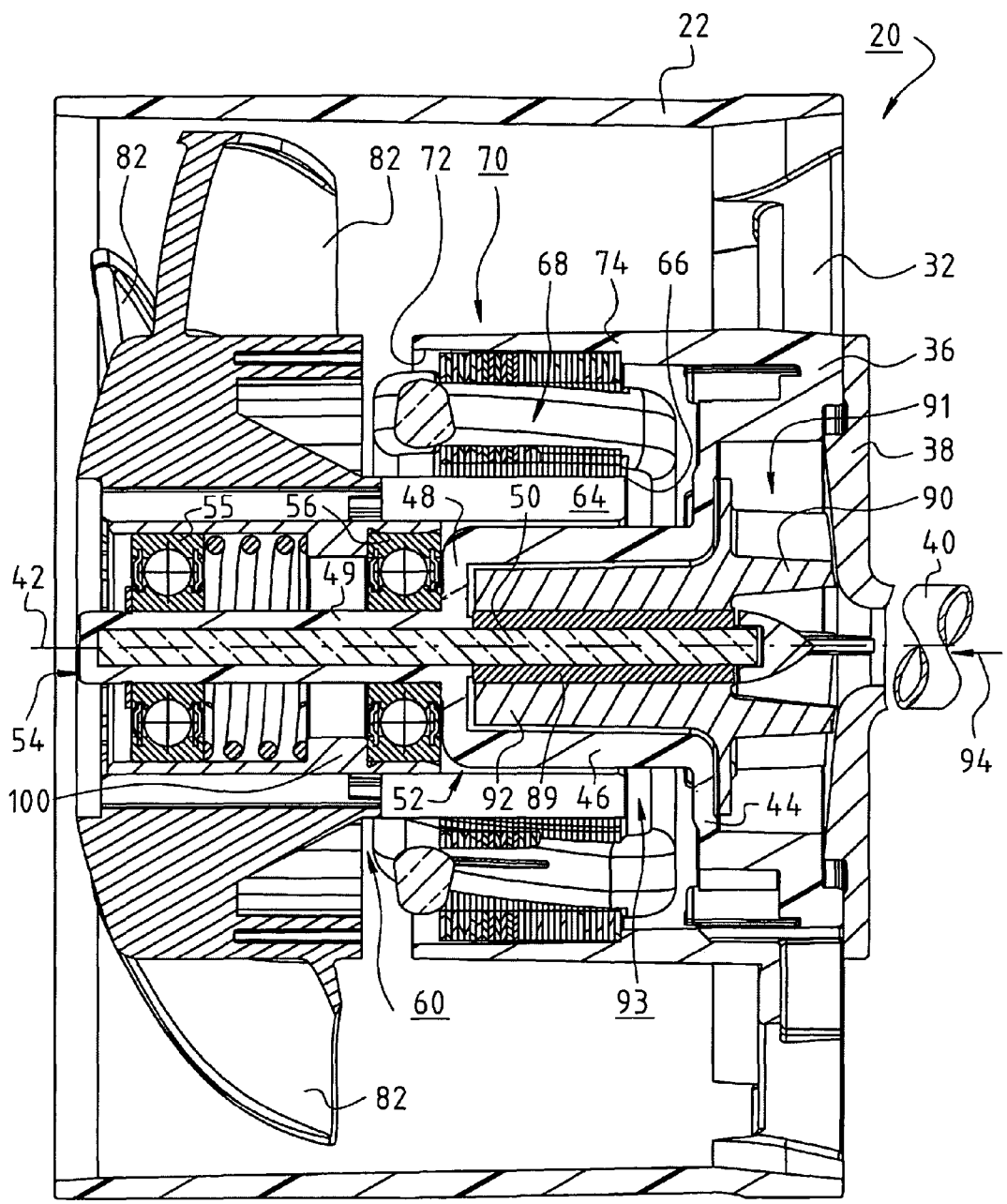
FIG. 1 is a longitudinal section through a preferred embodiment of an arrangement according to the present invention.

In the description that follows, the terms "upper," "lower," "left," and "right" refer to the particular figure. Identical or identically functioning parts are labeled with the same reference characters whenever possible, and are described only once.

FIG. 1 is a longitudinal section through an exemplifying embodiment of an arrangement 20 according to the present invention. The latter has externally an approximately cylindrical fan housing 22. This is connected, via obliquely extending struts or spokes 32, to cylindrical part 36 of a pump housing that, in the completed state, is closed off by a cover 38 on which is located an inlet tube 40. Cover 38 can be connected to part 36 in liquid-tight fashion, for example by way of an adhesive join, by plastic welding, by means of an O-ring seal, etc.

Part 36 transitions on its left side (in FIG. 1) into a portion 44 that proceeds perpendicular to a rotation axis 42 and transitions on its radially inner side into a cylindrical partitioning tube 46. At its left end (in FIG. 1) partitioning tube 46 is closed off by a portion 48, on which is mounted in suitable fashion a shaft 50 that is made of a ceramic material and projects to the right, in the direction defined by rotation axis 42. Partitioning tube 46 and portion 48 together form a so-called partitioning can 52. The latter can also have a geometrical shape other than the one depicted in FIG. 1.

A partitioning tube or partitioning can is understood in electrical engineering as a component, made of a nonmagnetic material such as plastic or stainless steel, that extends at least in part through the air gap of a magnetic circuit and forms there a fluid barrier that does not, or does not substantially, impede the magnetic flux in the air gap. The term "canned motor" is often used.

Adjoining portion 48 on the left is a non-rotating shaft 54. The latter has an outer corrosion-inhibiting layer 49 that is formed by a plastic, normally the plastic of partitioning can 52 with which said layer 49 is usually integrally configured. Located inside layer 49 is ceramic shaft 50, which therefore in this case has the function, together with plastic layer 49, of forming and stiffening second shaft 54. Journaled on it by means of a left rolling bearing 55 and a right rolling bearing 56 is a sleeve 57 (FIG. 2), made of soft ferromagnetic material, that is part of a rotor 60 whose rotor magnet is labeled 64. The outer corrosion-inhibiting layer 49 also produces hermetic sealing of the region through which a liquid flows, which region is depicted on the right in FIG. 1. The risk of leaks thereby becomes particularly low.

Layer 49, applied by injection molding, also ensures that the straightness and running tolerance of shaft 54, relative to shaft 50 and relative to an opening 72 described below, are further improved, resulting in an even lower level of solid-borne sound for the entire unit.

Figure 2:
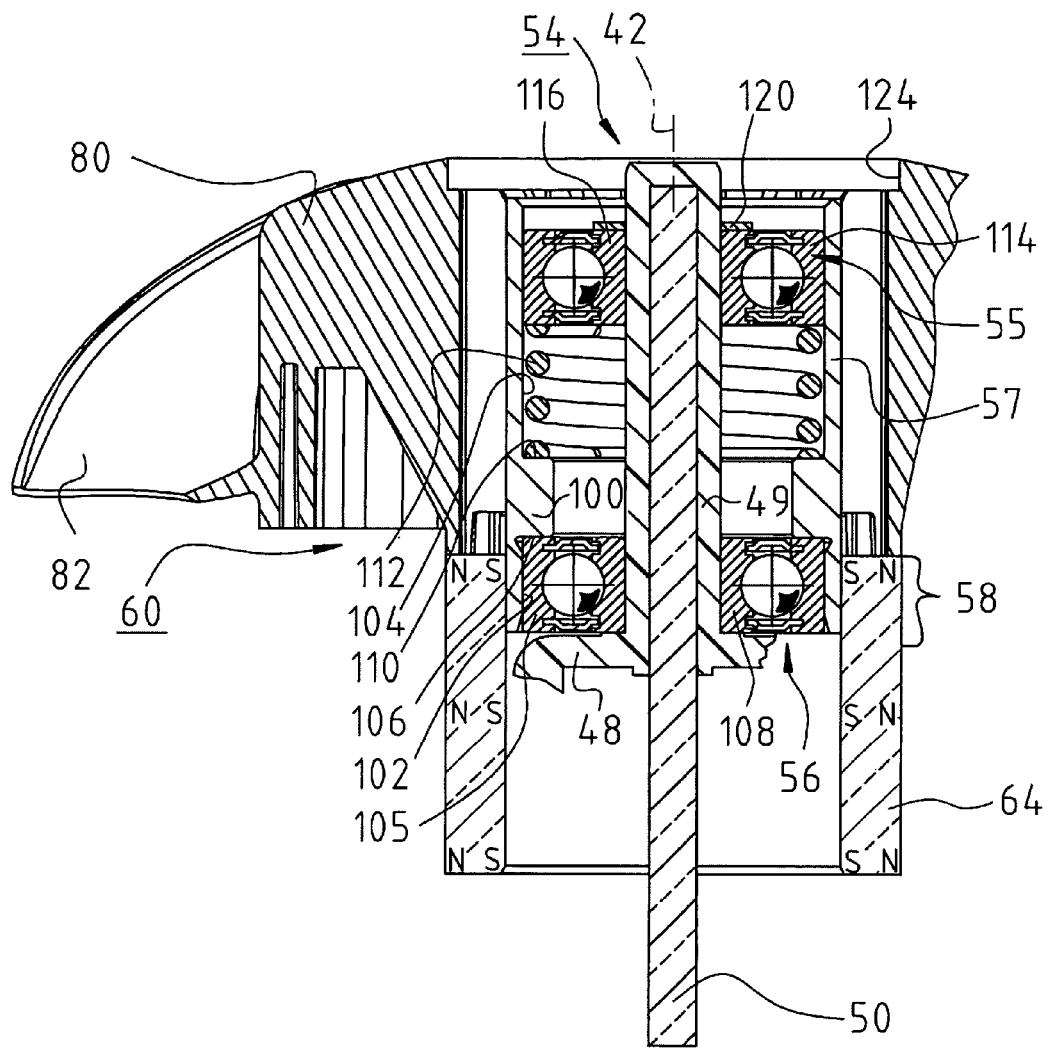
FIG. 2 is an enlarged portion of FIG. 1.

Sleeve 57 made of ferromagnetic material has a dual function:

It forms a magnetic yoke for rotor magnet 64, which latter is depicted particularly clearly in FIG. 2 and is implemented as a cylindrical ring made of magnetic material that, as depicted, is preferably magnetized radially, e.g. with four poles that are indicated partly in FIG. 2. Sleeve 57 is connected for this purpose, at a lower (in FIG. 2) region 58, to the inner side of rotor magnet 64, for example by adhesive bonding or by being pressed on.

It forms the hub of a fan wheel 80 of any design, which wheel will be described below with reference to an example and rotates during operation about non-rotating shaft 54, being driven by rotor 60.

As FIG. 1 shows, ring magnet 64 is separated by an air gap 66 from stator 68 of an electronically commutated internal-rotor motor (ECM) 70. As FIG. 1 shows, stator 68 is mounted in the cylindrical opening 72 of a carrier part 74 that preferably is implemented integrally with portion 44. During operation, ring magnet 64 rotates around partitioning can 52.

Fan wheel 80, which can be implemented e.g. as an axial, diagonal, or radial fan wheel, is mounted on sleeve 57. Said fan wheel has an approximately cylindrical outer part 81 whose outside diameter corresponds to that of the carrier part, and fan blades 82 are arranged, in the manner depicted in FIG. 1, on said part 81. During operation, blades 82 rotate within fan housing 22 and deliver air through it. Fan wheel 80 is preferably injection-mounted onto sleeve 57 by plastic injection molding. For that purpose, sleeve 57 is placed into the injection mold before the injection operation. Alternatively, fan wheel 80 can also be manufactured as an individual part, and then pressed or adhesively bonded onto sleeve 57.

Pump wheel 90 of a centrifugal pump or other fluid kinetic machine 91 is rotatably journaled on shaft 50 by means of a plain bearing 89, said pump wheel preferably being implemented integrally with a plastic-matrix first permanent magnet 92. The latter preferably has the same number of magnet poles as ring magnet 76 (which hereinafter will also be referred to as the second permanent magnet), and forms therewith a magnetic coupling 93 that transfers to pump wheel 90, through partitioning can 92, the torque generated by motor 70, and thereby drives said wheel at the rotation speed of rotor 60.

The result is that during operation, liquid is drawn in through connecting pipe 40 in the direction of an arrow 94, and delivered outward through an outlet connecting pipe (not depicted).

Rotor 60 therefore drives not only fan wheel 80 by way of a direct mechanical coupling, but also pump wheel 90 via magnetic coupling 93.

It is space-saving and therefore very advantageous that motor 70 and magnetic coupling 93 are nested into one another, magnet 92 of pump wheel 90 being the innermost rotating element. This enables the diameter of magnet 92 to be made as small as is tolerable, given the torque to be transferred.

Because magnet 92 rotates directly in the pumped fluid, the fluid immediately adjacent to it adheres directly to it, and moves at the same circumferential speed.

This fluid also adheres at the interface to the stationary partitioning can 52, with the result that it is at a standstill there. A monotonic velocity gradient exists between these two extreme values. The fluid in the gap between first magnet 90 and housing 52 is thus exposed to shear stresses, and frictional losses occur because of the viscosity of the fluid. A critical factor for these losses is the diameter of the rotating surfaces, the square of which diameter enters into the equation for the frictional torque. The frictional power dissipation thus increases as the cube of the diameter ($D^3$) of the rotating surfaces, and can consequently be minimized in the context of the present invention.

The design that has been depicted and described allows very high efficiency for a pump of this kind that is driven via a magnetic coupling 93, since the rotating surfaces on first magnet 92 can be implemented to be small. As already stated, the smallest possible diameter is determined by the torque that must be transferred by magnetic coupling 93. If the diameter were made even smaller, this would result in a decrease in pump output, i.e. with the arrangement described, the magnetic coupling can be designed so that good efficiency is obtained at the working point.

Further optimization is possible by using particularly high-grade magnetic materials for permanent magnets 64 and 92. This allows a further reduction in the diameters of the rotating surfaces, which yields particularly high efficiency, but it increases cost.

As FIG. 1 and FIG. 2 show, in this embodiment the sleeve 57 has a radially inwardly protruding projection 100 that, in FIG. 2, separates a short lower cylindrical portion 102 from a long upper cylindrical portion 104 of the same diameter.

Outer ring 105 of rolling bearing 56 is placed into portion 102, and the lower (in FIG. 2) shoulder 106 forms a stop for the upper shoulder of outer ring 105. Inner ring 108 of rolling bearing 56 is slid onto shaft 54.

Figure 4:
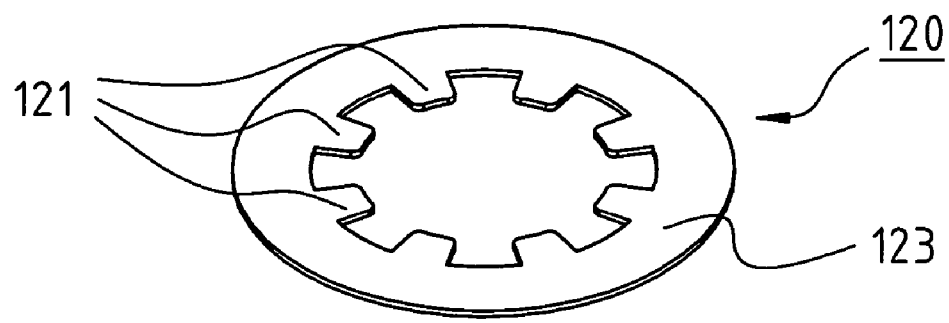
FIG. 4 is a perspective depiction of a claw washer 120.
Figure 5:
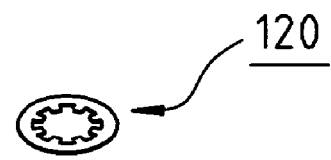
FIG. 5 shows claw washer 120 of FIG. 4 at approximately 1:1 scale.

Projection 100 has an upper (in FIG. 2) shoulder 110 that serves as an abutment for the lower end of a compression spring 112 whose upper end bears against the lower shoulder of outer ring 114 of upper abutment 55. The latter has an inner ring 116 whose upper shoulder abuts against a retaining member 120 such as a snap ring or a claw washer. An example of a claw washer 120 is depicted in FIGS. 4 and 5.

As depicted, a snap ring is mounted in an annular groove of shaft 54, and claw washer 120 can be directly pressed, to the correct dimension, onto shaft 54 into the desired position. A claw washer 120 can be particularly advantageous for leak-prevention reasons. FIGS. 4 and 5 show a typical claw washer 120 at enlarged scale. It has claws 121 that protrude radially inward from an outer ring 123 and, upon assembly, dig into plastic layer 49 of shaft 54 and thereby retain the inner ring of rolling bearing 56 in its position. FIG. 5 shows claw washer 120 at approximately actual size, i.e. at 1:1 scale.

Under load, compression spring 112 presses outer ring 114 of rolling bearing 55 upward, and thereby biases outer ring 114 with respect to inner ring 116; this produces quiet running.

Assembly

Stator 74, on which are arranged left-hand (in FIG. 1) shaft 54 and right-hand shaft 50, is installed first.

Rolling bearing 56 is then slid, pressed, or adhesively bonded onto shaft 54. Rotor 60 is then inserted so that shoulder 106 of projection 100 abuts against outer ring 105 of rolling bearing 56.

Alternatively, rolling bearing 56 can also be first slid, pressed, or adhesively bonded into sleeve 57 and into portion 102, and rotor 60 together with rolling bearing 56 is then slid or pressed onto shaft 54.

Compression spring 112 is then inserted so that its lower end abuts against shoulder 110, and rolling bearing 55 is then brought into the position shown in FIGS. 1 and 2, spring 112 being loaded and rolling bearing 55 being retained in this position by snap ring 120. A cover is then inserted into an opening 124 provided therefor, in order to protect rolling bearings 55 and 56 from contamination. One such cover 230 is depicted and described in FIG. 3.

Rolling bearings 55 and 56 journal sleeve 57 and, with it, fan wheel 80 and ring magnet 64, which in turn is driven by internal-rotor motor 70 during operation. Pump 91 is driven via magnetic coupling 93, ring magnet 64 of internal-rotor motor 70 interacting with ring magnet 92 of pump wheel 90 as magnetic coupling 93.

Figure 3:
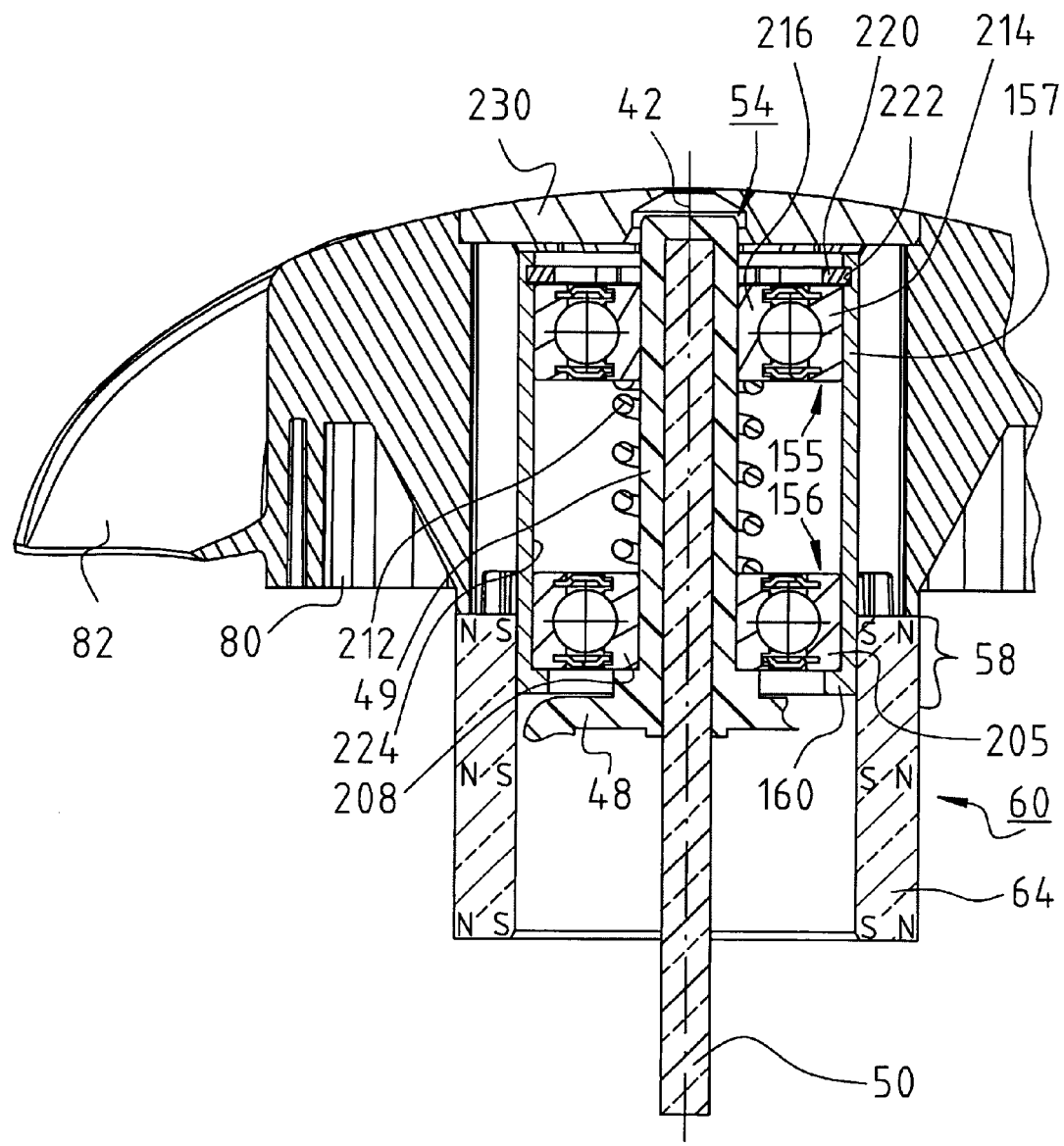
FIG. 3 shows a variant of FIGS. 1 and 2.

FIG. 3 shows a variant of the first exemplifying embodiment according to FIGS. 1 and 2. This variant is identical to FIGS. 1 and 2 with regard to pump 91, internal-rotor motor 70, and shafts 50 and 54, and differs in terms of the manner of journaling; for that reason, only the differing parts are depicted in order to avoid unnecessary length.

In FIG. 3 as well, a sleeve 157 made of soft ferromagnetic material is used; onto its outer side, at 58, rotor magnet 64 is adhesively bonded or pressed on so that sleeve 157 serves as a soft ferromagnetic yoke for ring magnet 64, which is implemented identically to rotor magnet 64 according to FIGS. 1 and 2.

Sleeve 157 also serves as a carrier for fan wheel 80. The sleeve has at its right end (in FIG. 3) an inwardly projecting shoulder 160 that serves as a stop for a right rolling bearing 156 that is introduced with its outer ring 205 into sleeve 157 and is applied with its inner ring 208 onto shaft 54; both operations are possible by sliding on, pressing on, or adhesive bonding.

A left rolling bearing 155 is also slid with its outer ring 214 into sleeve 157 and is supported there by means of a snap ring 220 that is inserted into an annular groove 222 on inner side 224 of sleeve 157. Alternatively, retaining member 220 can also be embodied as a claw washer that is pressed to the correct dimension, i.e. as far as the desired position, into sleeve 157.

Inner ring 216 of rolling bearing 155 is arranged on shaft 54 with a slight clearance, in order to enable bracing by a compression spring 212 that is arranged on shaft 54 between the two inner rings 208, 216. The two rolling bearings 155, 156 are reciprocally biased with respect to one another by it, resulting in particularly quiet running of arrangement 20.

The advantage that results, as compared with FIG. 2, is that spring 112 can be smaller and thus more economical, and that it is easier to manufacture a permanent annular groove 222 in metal part 157.

Assembly

Assembly is similar to what was described with reference to FIGS. 1 and 2. Firstly, stator 68 is installed, usually together with pump 91. The latter can, of course, also be installed later.

The rotor with ring magnet 64, and sleeve 157 with rolling bearing 156 arranged therein, are then installed on shaft 54. These are followed by bracing spring 212, left rolling bearing 155, and lastly retaining member 220, e.g. a snap ring or a claw washer.

Lastly, a cover 230, that protects bearings 155, 156 from contamination, is installed.

Numerous variants and modifications are of course possible within the scope of the present invention.

What is claimed is:

1. An arrangement for delivering fluids comprising:
    a fluid pump (91), implemented as a centrifugal pump, which includes a pump wheel (90) that is connected to a first permanent magnet (92);
    an electronically commutated internal-rotor motor (70) having a stator (68), inside which is rotatably arranged a rotor (60) having a second permanent magnet (64) that interacts with the first permanent magnet (92) as a magnetic coupling (93);
    a partitioning can (52) that separates the first permanent magnet (92) of the magnetic coupling (93), said first permanent magnet being arranged inside said partitioning can (52), in fluid-tight fashion from the second permanent magnet (64) of the internal-rotor motor (70), said second permanent magnet being arranged outside the partitioning can (52),
    the stator (68) of the internal-rotor motor (70) being arranged at least predominantly radially outside the magnetic coupling (93);
    a bearing arrangement (55, 56; 155, 156),
    a first stationary shaft (54) mounted on an outer side of the partitioning can (52) and surrounded, on a side facing away from the fluid pump (91), by a layer (49) made of plastic material, said first stationary shaft (54), together with the bearing arrangement (55, 56; 155, 156), serving for rotatable journaling of the rotor (60) of the internal-rotor motor (70), and
    a second stationary shaft (50) provided, on an inner side of said partitioning can (52), for journaling the pump wheel (90),
    the second stationary shaft (50) being made of a dimensionally stable material and extending into the first stationary shaft (54) in order, together with the layer (49) made of plastic material, to form and stiffen the first stationary shaft (54) there,
    the bearing arrangement (55, 56; 155, 156) being arranged at the circumference of the first stationary shaft (54) and the second stationary shaft (50).

2. The arrangement according to claim 1, wherein the layer (49) made of plastic material is an outer corrosion-inhibiting plastic layer (49).

3. The arrangement according to claim 1, in which the pump wheel (90) of the fluid pump (91) is journaled on the second stationary shaft (50) by means of at least one plain bearing (89).

4. The arrangement according to claim 1, wherein
    the partitioning can (52) is formed from a plastic material; and
    the part of the second stationary shaft (50) extending into the first stationary shaft (54) provides a core for the first stationary shaft (54), the outer side of which is surrounded by the layer (49) made of plastic material.

5. The arrangement according to claim 4, in which the layer (49) made of plastic material is implemented integrally with the plastic partitioning can (52).

6. The arrangement according to claim 1, further comprising a sleeve (57; 157) made of a ferromagnetic material, serving as a magnetic yoke for the second permanent magnet (64) of the internal-rotor motor (70), which sleeve forms at least a part of a bearing element for journaling said second permanent magnet (64).

7. The arrangement according to claim 6,
    wherein the bearing arrangement (55, 56; 155, 156) comprises rolling bearings (55, 56; 155, 156), arranged on the first stationary shaft (54) for journaling the sleeve (57; 157).

8. The arrangement according to claim 7, in which the sleeve (57; 157) is equipped with an inwardly protruding projection (100; 160).

9. The arrangement according to claim 8, in which the inwardly protruding projection (100; 160) serves as a support for an outer ring (105; 205) of one of said rolling bearings (55, 56; 155, 156).

10. The arrangement according to claim 8, further comprising
    a compression spring, and wherein
    the projection (100) serves as a brace for one end of said compression spring (212) whose other end abuts against a bearing ring (114) of one of said rolling bearings (55).

11. The arrangement according to claim 6,
    wherein the bearing arrangement (55, 56; 155, 156) comprises rolling bearings (55, 56; 155, 156),
    a snap ring (220) is provided, and
    an annular groove (222) for receiving said snap ring (220) is provided in the sleeve (157) for supporting one of said rolling bearings (55, 56; 155, 156).

12. The arrangement according to claim 1, wherein
    the layer (49) made of plastic material is implemented in a fluid-tight manner, in order to minimize any loss of circulating fluid from the fluid pump (91).

13. The arrangement according to claim 1, wherein
the bearing arrangement (55, 56; 155, 156) comprises rolling bearings (55, 56; 155, 156), and
a retaining member (120, 220) is provided in order to retain one of the rolling bearings (55, 56; 155, 156) in the arrangement.

14. The arrangement according to claim 13, in which the retaining member (120; 220) is pressed onto said first stationary shaft (54).

15. The arrangement according to claim 13, wherein said retaining member is a snap ring.

16. The arrangement according to claim 13, wherein said retaining member is a claw washer.

17. The arrangement according to claim 2, further comprising
a sleeve (57; 157) made of a ferromagnetic material, serving as a magnetic yoke for the second permanent magnet (64) of the internal-rotor motor (70), which sleeve forms at least a part of a bearing element for journaling said second permanent magnet (64).

18. The arrangement according to claim 3, further comprising
a sleeve (57; 157) made of a ferromagnetic material, serving as a magnetic yoke for the second permanent magnet (64) of the internal-rotor motor (70), which sleeve forms at least a part of a bearing element for journaling said second permanent magnet (64).

19. The arrangement according to claim 4, further comprising
a sleeve (57; 157) made of a ferromagnetic material, serving as a magnetic yoke for the second permanent magnet (64) of the internal-rotor motor (70), which sleeve forms at least a part of a bearing element for journaling said second permanent magnet (64).

20. The arrangement according to claim 1, wherein
the second stationary shaft (50) is made at least partly of a ceramic material.

21. The arrangement according to claim 1, wherein
the dimensionally stable material (50) is a ceramic material.

22. The arrangement according to claim 1, wherein the layer (49) made of plastic material provides a hermetic sealing of a part of the second stationary shaft (50) extending into the first stationary shaft (54) such that no fluid can exit the fluid pump (91) along said part of the second stationary shaft (50) extending into the first stationary shaft (54).

* * * * *